June 25, 1957 M. E. PREWETT 2,797,005
WHEEL OR TIRE HANDLING DEVICE
Filed Nov. 13, 1956 3 Sheets-Sheet 1
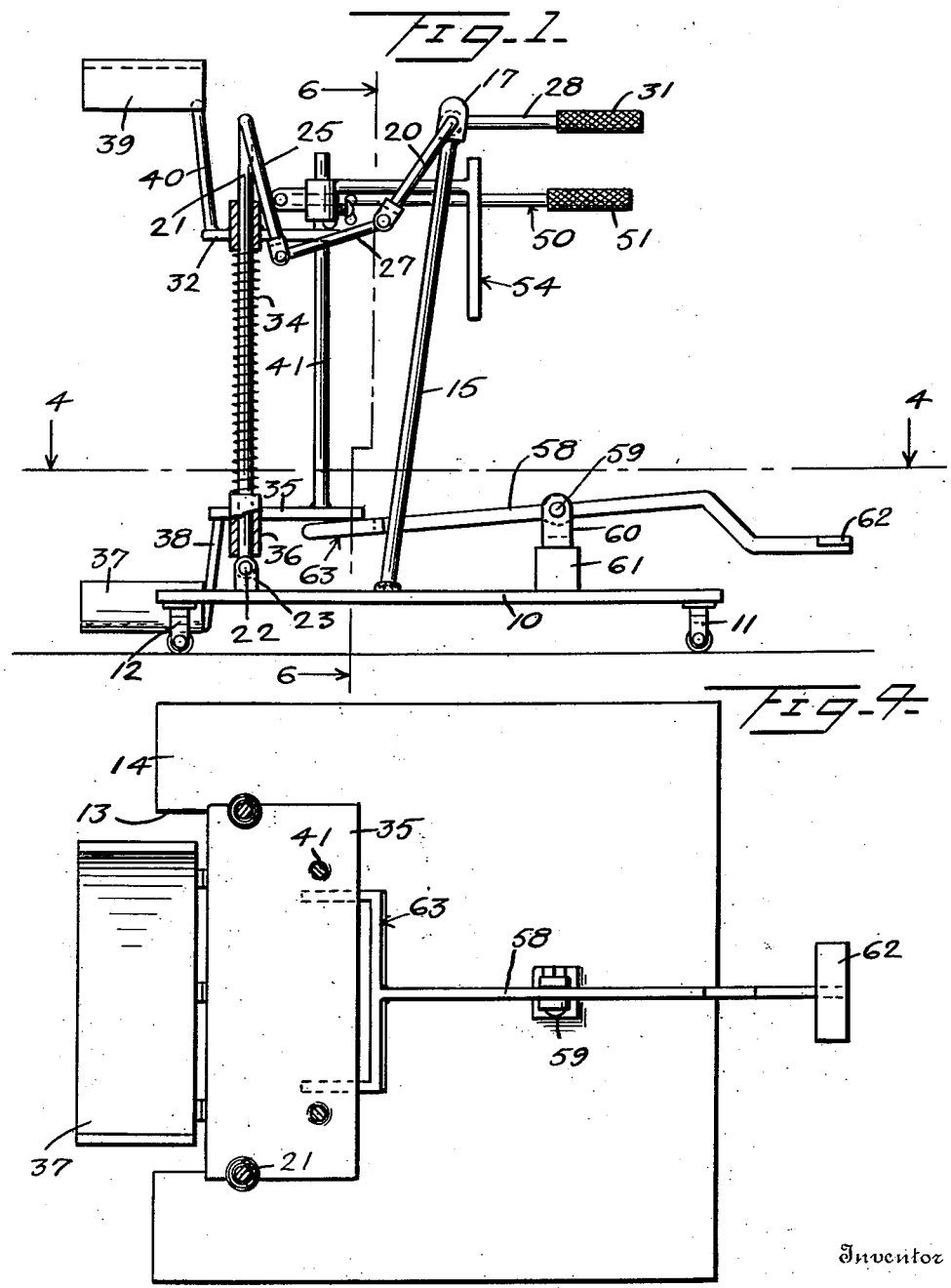
Inventor
M. E. Prewett
By C. A. Snow & Co.
Attorneys.

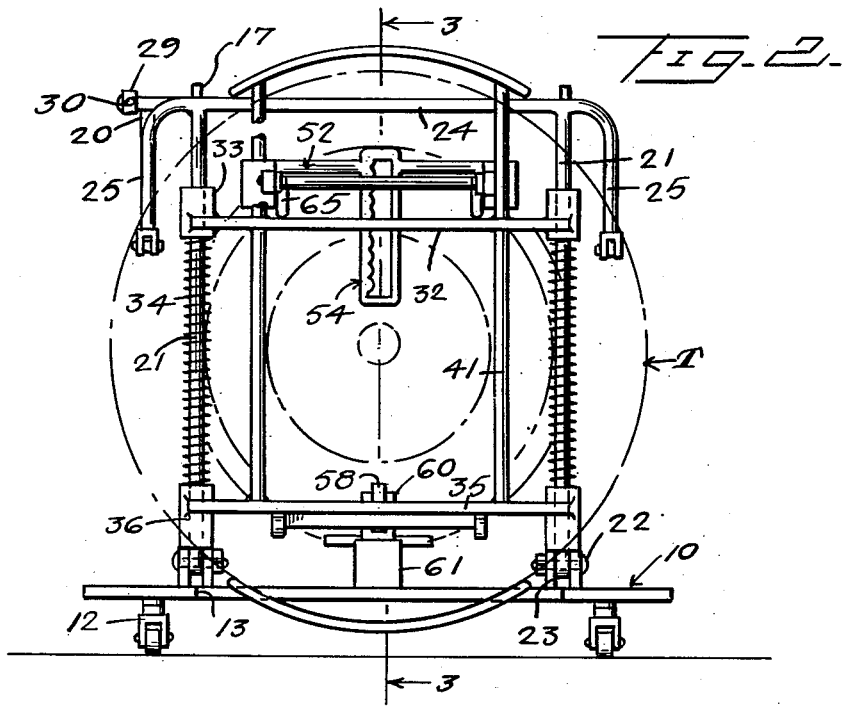
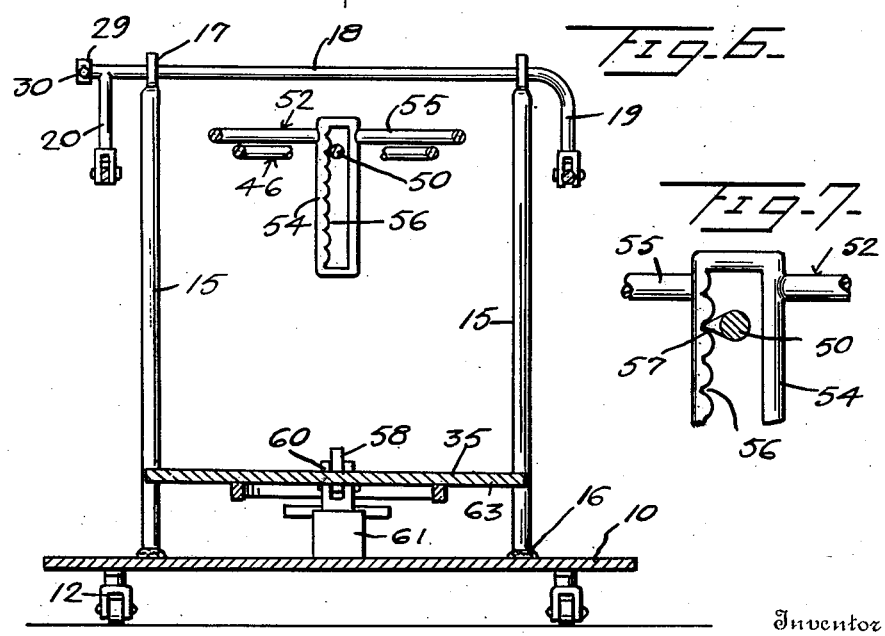

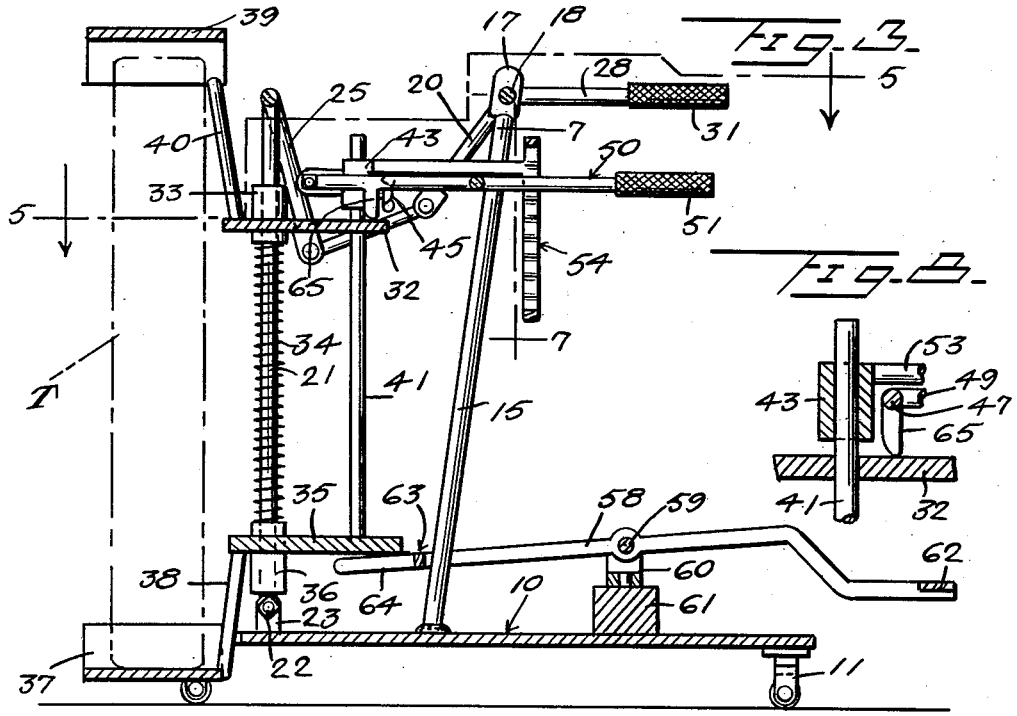
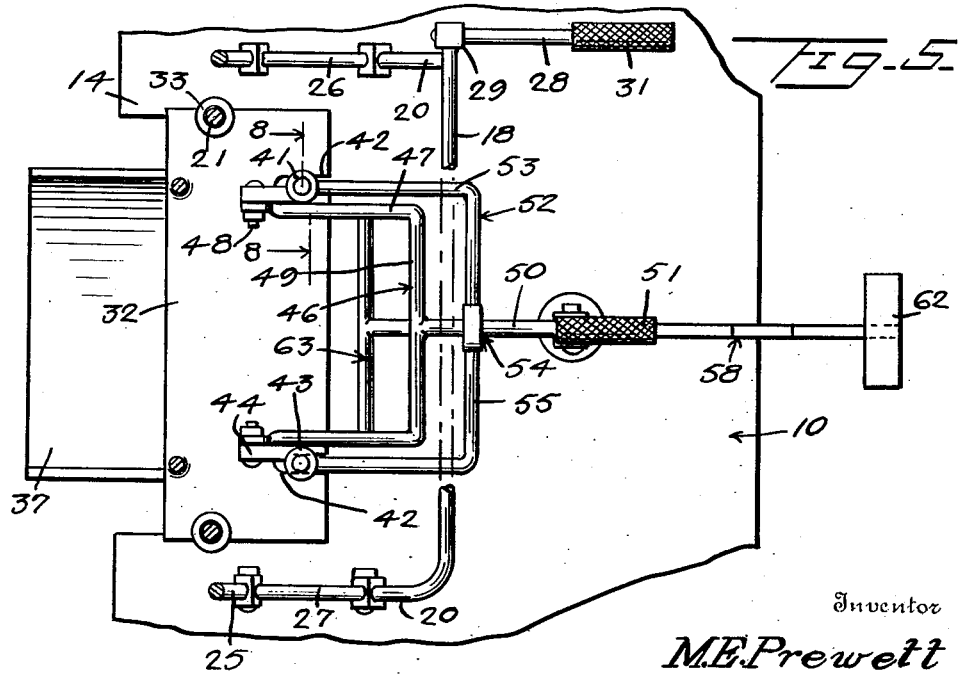

2,797,005
WHEEL OR TIRE HANDLING DEVICE

Marshall E. Prewett, Corpus Christi, Tex.

Application November 13, 1956, Serial No. 621,597

3 Claims. (Cl. 214—332)

This invention relates to a wheel or tire handling device.

In the applying or removing of truck or other large and heavy tires and wheels considerable difficulty is encountered due to the weight and size of the articles, so that it is almost impossible for one person to properly handle the article. It is, therefore, an object of this invention to provide a truck or dolly which includes adjustable means for gripping the tire, and means for raising or lowering the gripped tire.

Another object of this invention is to provide a wheel or tire handling device whereby the wheel or tire may be firmly clamped in upright position and the tire then tilted, so that the wheel or tire may be brought up to the axle and wheel hub in proper position regardless of the angular position of the vehicle or wheel.

A further object of this invention is to provide a wheel or tire handling dolly which can be operated by one person and which will permit the work to be done quickly and properly.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a detail side elevation partly in vertical section of a wheel lifting device constructed according to an embodiment of this invention.

Fig. 2 is a detail front elevation of the device.

Fig. 3 is a vertical section taken on line 3—3 of Fig. 2.

Fig. 4 is a sectional view taken on line 4—4 of Fig. 1.

Fig. 5 is a sectional view taken on line 5—5 of Fig. 3.

Fig. 6 is a sectional view taken on line 6—6 of Fig. 1.

Fig. 7 is a fragmentary sectional view taken on line 7—7 of Fig. 3.

Fig. 8 is a fragmentary sectional view taken on line 8—8 of Fig. 5.

Referring to the drawings, the numeral 10 designates generally a base plate having a pair of casters 11 adjacent the rear thereof and the plate 10 also has a pair of forward casters 12 adjacent the forward end thereof. The forward portion of the plate 10 is provided with a cutout 13 which forms a pair of forwardly projecting arms 14 at the forward portion of the plate 10. A pair of upwardly and forwardly projecting supporting bars 15 are fixed as at 16 at their lower ends to the plate 10. The bars 15 have extending through flattened upper end portions 17 thereof, a horizontal shaft 18. The shaft 18 is provided adjacent each end thereof with downwardly projecting levers or arms 19 and 20. A pair of upwardly extending bars 21 are rockably mounted on pivot members 22 extending through ears 23 which are fixed to the upper side of the plate 10. The bars 21 have a connecting bar 24 fixed between the upper ends thereof and the bar 24 has downwardly projecting arms 25, one at each end thereof and disposed in laterally spaced relation to the bars 21. The arms 25 are rockably connected to the arms 19 and 20 by means of links 26 and 27. The lever 28 having a bushing 29 is secured by fastening means 30 to one end of shaft 18 and the rear end of lever 28 has a hand grip 31 mounted thereon. The lever 28 is provided so that the bars 21 may be rocked forwardly or rearwardly to provide for the desired tilting of the tire or wheel carriers or clamping means, as will be hereinafter described.

A plate 32 is disposed between the bars 20 and is provided with bushings 33 which slidably engage the bars 21. A spring 34 is disposed about each bar 21 and bears at its upper end against the lower side of plate 32. A lower plate 35 extends between the lower portions of the bars 21 and has a pair of bushings 36 which slidably engage about the bars 21 and bear against the lower ends of the springs 34. A lower arcuate wheel or tire carrier or clamping member 37 is disposed below the plate 35 and is fixed relative to the plate 35 by means of a pair of connecting bars 38. An upper clamping member 39 is disposed above upper plate 32 and is connected to plate 32 in forwardly offset position by means of a pair of connecting bars 40.

The lower plate 35 has fixed thereto a pair of upwardly projecting rods 41 and the rods 41 extend loosely through slots 42 which are formed in the rear portion of upper plate 32. A bushing or cylindrical slide member 43 is disposed about each rod 41 and the bushing or slide member 43 has projecting forwardly therefrom an ear 44. Each bushing 43 is adapted to be secured in vertically adjusted position by means of a set screw 45. A U-shaped pressure member generally indicated at 46, has the side arms 47 thereof pivotally secured to the ears 44 by means of pivot members 48. The bight 49 of the U-shaped member 46 has a forwardly projecting lever 50 fixed thereto and a hand grip 51 is disposed about the rear end of lever 50. A U-shaped keeper supporting member 52 has the parallel or side arms 53 thereof fixed to the bushings 43 and an elongated looped keeper 54 is secured to and depends there the bite 55 of U-shaped member 52. The keeper 54 is formed with notches 56 which are adapted to be engaged by a V-shaped locking member 57 which extends from one side of the lever 50.

In order to provide a means whereby the lower clamping member 37 may be vertically raised, I have provided a foot operating lever 58 which is rockably mounted on a pivot member 59 extending between a pair of ears 60. The ears 60 are mounted on a block 61 which is fixed to the upper side of plate 10. The rear end of lever 58 has a pedal or tread member 62 secured thereto and the forward or opposite end of the lever 58 has a U-shaped member 63 fixed thereto. The parallel sides or arms 64 of U-shaped member 63 engage beneath plate 35 in order that downward pressing of pedal 62 will raise plate 35 and also raise the lower wheel or tire clamping member 37 upwardly against the bottom of the tire T. When the lower clamping member 37 has been disposed in contact with the lower side of the tire T the bushings 43 may be secured to the rods 41 by the set screw 45. At this time the lever 50 will be in an upwardly and rearwardly inclined position with the plate 32 bearing substantially against the lower ends of the bushings 43. The upper clamping member 39 may then be moved downwardly to tightly bear against the top of the tire T by downwardly swinging of lever 50. A cam lug 65 is carried by each arm 47 of U-shaped member 46 and bears against the upper side of plate 32 so that downward swinging of lever 50 will move plate 32 and clamping member 39 downwardly, in order that clamping member 39 will tightly bind against the upper side of the tire. When lever 50 is in substantial horizontal position the cam members 65 will tightly lock plate 32 in tire clamping position. With the tire tightly clamped between the clamping members 37 and 39, at the time the tire is being applied to the hub or axle, the tire T may be tilted either forwardly or rearwardly by rocking of lever 28. Rocking of lever 28 will move rods 21, either forwardly or rearwardly so as to thereby tilt the tire T which is firmly clamped between the clamping member 37 and 39.

The device hereinabove described will provide a means whereby a workman will be able to conveniently handle a heavy tire and wheel. In the removal of the tire and wheel the device is moved up to the side of the wheel with the wheel in raised position. The clamping member 37 is extended beneath the raised tire and the upper clamping member 37 is disposed over the top of the tire. Lever 50 upon swinging downwardly will tightly clamp the tire between the clamping members 37 and 39 and the clamping members will be locked in their clamping position by downward swinging of lever 50. The tire and wheel may then be moved away from the vehicle.

What is claimed is:

1. A wheel or tire handling dolly comprising a base plate, wheels carried by said plate, upper and lower tire clamping members, a pair of upright guide bars, means pivotally securing the lower ends of said bars to said plate, a connecting bar fixed between the upper ends of said upright bars, upper and lower plates slidably engaging said upright bars, a pair of vertical bars fixed to said lower plate, a pair of bushings on the upper side of said upper plate through which said vertical bars engage, means adjustably securing said vertical bars in said bushings, a U-shaped lever pivotally secured to said bushings, cam means carried by said lever engaging the upper side of said upper plate, means fixedly connecting said upper clamping member to said upper plate, means fixedly connecting said lower clamping member to said lower plate, and means connected with said upright guide bars for adjusting the angle thereof relative to the vertical.

2. A wheel or tire handling dolly comprising a base plate, wheels carried by said plate, upper and lower tire clamping members, a pair of upright guide bars, means pivotally securing the lower ends of said bars to said plate, a connecting bar fixed between the upper ends of said upright bars, upper and lower plates slidably engaging said upright bars, a pair of vertical bars fixed to said lower plate, a pair of bushings on the upper side of said upper plate through which said vertical bars engage, means adjustably securing said vertical bars in said bushings, a U-shaped lever pivotally secured to said bushings, cam means carried by said lever engaging the upper side of said upper plate, means releasably locking said lever in adjusted position, means fixedly connecting said upper clamping member to said upper plate, means fixedly connecting said lower clamping member to said lower plate, and means connected with said upright guide bars for adjusting the angle thereof relative to the vertical.

3. A wheel or tire handling dolly comprising a base plate, wheels carried by said plate, upper and lower tire clamping members, a pair of upright guide bars, means pivotally securing the lower ends of said bars to said plate, a connecting bar fixed between the upper ends of said upright bars, upper and lower plates slidably engaging said upright bars, a pair of vertical bars fixed to said lower plate, a pair of bushings on the upper side of said upper plate through which said vertical bars engage, means adjustably securing said vertical bars in said bushings, a U-shaped lever pivotally secured to said bushings, cam means carried by said lever engaging the upper side of said upper plate, means fixedly connecting said upper clamping member to said upper plate, means fixedly connecting said lower clamping member to said lower plate, means connected with said upright guide bars for adjusting the angle thereof relative to the vertical, and a lever rockably carried by said base plate engaging beneath said lower plate for vertically moving said lower clamping member.

No references cited.